United States Patent
Sames

(10) Patent No.: US 10,005,578 B2
(45) Date of Patent: Jun. 26, 2018

(54) CLIPPING TOOL ASSEMBLY

(71) Applicant: Poly-clip System GmbH & Co. KG, Hattersheim (DE)

(72) Inventor: Jörg Sames, Alten Buseck (DE)

(73) Assignee: Poly-clip System GmbH & Co., Hattersheim (DE)

( * ) Notice: Subject to any disclaimer, the term of this patent is extended or adjusted under 35 U.S.C. 154(b) by 985 days.

(21) Appl. No.: 13/940,977

(22) Filed: Jul. 12, 2013

(65) Prior Publication Data

US 2014/0013711 A1 Jan. 16, 2014

(30) Foreign Application Priority Data

Jul. 13, 2012 (EP) .................................... 12176312

(51) Int. Cl.
 *B65B 51/04* (2006.01)
 *A22C 11/12* (2006.01)
(52) U.S. Cl.
 CPC ............ *B65B 51/04* (2013.01); *A22C 11/125* (2013.01)
(58) Field of Classification Search
 None
 See application file for complete search history.

(56) References Cited

U.S. PATENT DOCUMENTS

| | | | | | |
|---|---|---|---|---|---|
| 3,210,835 A | * | 10/1965 | Tipper | ................. | A22C 11/125 29/243.57 |
| 3,368,322 A | * | 2/1968 | Yushiro | ................... | B65B 51/04 29/33 E |
| 3,381,359 A | * | 5/1968 | Schroeder | ............... | B65B 51/04 29/243.57 |
| 3,389,533 A | * | 6/1968 | Tipper | ...................... | B65B 9/15 29/33.5 |
| 3,432,980 A | * | 3/1969 | Austin | ...................... | B65B 9/12 383/71 |
| 3,543,378 A | * | 12/1970 | Klenz | .................. | A22C 11/125 29/243.57 |
| 3,587,204 A | * | 6/1971 | George | ................ | A22C 11/104 24/27 |
| 3,728,774 A | * | 4/1973 | Steller | ..................... | B65B 51/04 227/88 |

(Continued)

FOREIGN PATENT DOCUMENTS

| | | |
|---|---|---|
| EP | 0900733 A1 | 3/1999 |
| EP | 1848640 A1 | 10/2007 |
| WO | 2006/084127 | 8/2006 |

*Primary Examiner* — Hemant M Desai
*Assistant Examiner* — Tanzim Imam
(74) *Attorney, Agent, or Firm* — Fitch, Even, Tabin & Flannery LLP

(57) ABSTRACT

The present invention relates to a clipping tool assembly for closing at least one closure means, like a closure clip, in a packaging machine, like a clipping machine, for closing tubular or bag-shaped packaging casings. The clipping tool assembly comprises a first closing tool and a second closing tool, wherein at least the first closing tool is reversibly movable towards the second closing tool, between an opened position and a closed position, for closing the at least one closure means, and a drive means for reversibly moving at least the first closing tool towards the second closing tool in a closing direction. The clipping tool further comprises a pusher means provided in the region of the second closing tool for pushing the closure means just closed out of the second closing tool.

8 Claims, 2 Drawing Sheets

(56) References Cited

U.S. PATENT DOCUMENTS

| | | | | |
|---|---|---|---|---|
| 3,793,688 A | * | 2/1974 | Keating | B65B 51/04 140/82 |
| 4,004,339 A | * | 1/1977 | Velarde | B65B 51/04 29/243.56 |
| 4,044,426 A | * | 8/1977 | Kupcikevicius | A22C 11/0245 452/31 |
| 4,100,716 A | * | 7/1978 | Barroso | A22C 11/125 29/243.56 |
| 4,182,015 A | * | 1/1980 | Niedecker | B65D 33/1641 29/243.56 |
| 4,458,402 A | * | 7/1984 | Evans | B23P 19/08 29/243.56 |
| RE32,315 E | * | 12/1986 | Kollross | A22C 11/00 452/22 |
| 4,675,945 A | * | 6/1987 | Evans | A22C 11/105 452/48 |
| 4,773,128 A | * | 9/1988 | Stanley | A22C 11/0245 452/31 |
| 4,807,345 A | * | 2/1989 | Jacobson | B25B 27/146 29/243.56 |
| 4,827,591 A | * | 5/1989 | Arnone | A22C 11/125 29/243.56 |
| 5,743,792 A | * | 4/1998 | Hanten | A22C 11/0245 452/29 |
| 6,052,967 A | * | 4/2000 | Hambach | B65B 51/04 53/131.3 |
| 2004/0118302 A1 | * | 6/2004 | Muller | A22C 11/125 99/472 |
| 2006/0099897 A1 | * | 5/2006 | Lorenzo Barroso | A22C 11/0227 452/46 |
| 2007/0180795 A1 | * | 8/2007 | Topfer | A22C 11/0245 53/459 |
| 2008/0054044 A1 | | 3/2008 | Smith et al. | |
| 2008/0139095 A1 | * | 6/2008 | Mysker | A22C 11/0227 452/32 |
| 2008/0274681 A1 | * | 11/2008 | Hanten | A22C 11/125 452/48 |

* cited by examiner

CLIPPING TOOL ASSEMBLY

This application claims priority to, and the benefit of, European Patent Application No. 12 176 312.2-1260 filed 13 Jul. 2012 with the European Patent Office, which is hereby incorporated by reference.

BACKGROUND OF THE INVENTION

The present invention relates to a clipping tool assembly for closing at least one closure means, like a closure clip, in a packaging machine, for closing tubular or bag-shaped packaging casings, a clipping machine for producing sausage-shaped products as well as the use of the clipping tool assembly in a packaging machine for closing tubular or bag-shaped packaging casings.

In particular, the present invention relates to a clipping tool assembly for closing at least one closure means, like a closure clip, in a packaging machine, like a clipping machine, for closing tubular or bag-shaped packaging casings. The clipping tool assembly comprises a first closing tool and a second closing tool, wherein at least the first closing tool is reversibly movable towards the second closing tool, between an opened position and a closed position, for closing the at least one closure means and a drive means for reversibly moving at least the first closing tool towards the second closing tool in a closing direction.

The present invention further relates to a clipping machine for producing sausage-shaped products, like sausages, by filing a filling material into a tubular or bag-shaped packaging casing and closing said packaging casing by a closure means, like a closure clip, wherein the clipping machine comprises a clipping tool assembly according to the present invention and, the present invention relates to a clipping tool assembly for use in a packaging machine for closing tubular or bag-shaped packaging casings by at least one closure means, like a closure clip.

In the practice, it is known that, for example in the production of sausage-shaped products, filling material is fed by a filling machine through a filling tube of a clipping machine into a tubular casing material, which is stored on the filling tube and which is closed at its front end by a closing clip. The tubular casing material is pulled off from the filling tube while being filled. After a predetermined volume of filling material is filled into said tubular casing material, a displacement device with a first and a second pair of displacement elements forms a plait-like portion of the tubular casing material and the clipping machine places and closes at least one closing clip at the plait-like portion forming the back end of the sausage shaped product by respective closing tools which are reversibly movable towards the plait-like portion. After that, the sausage-shaped product just produced, is separated from the remaining casing material by a knife or the like of a cutting device of the clipping machine. The produced sausage-shaped products may contain various flowable filling materials, e.g. sausage meat, grease, adhesives, sealing compounds or the like.

From EP patent 0 900 733, a clipping machine for producing sausages is known, including first and second closing tool, a punch and a die, which are mounted to first ends of respective closing levers coupled by their second ends to a common pivot axis. For reversibly moving the closing tools between their opened and closed position, in order to place and close a closure clip on the filled and gathered tubular packaging casing, the closing levers are driven by a cam plate.

Moreover, for storing and/or transporting loosely goods or foodstuff, like fruit or vegetables, said goods may be packed in a tubular or bag-shaped packing casing. Said tubular or bag-shaped casing may be made of e.g. web-like material. While packing, a predetermined portion or number of said goods is filled into the bag-shaped casing or a tubular casing portion closed at one end. Clipping machines are also used for packing said goods into respective packing casings made of said web-like material, in particular, for applying closure means, like substantially U-shaped closure clips, to said packing casing for closing the packing casing.

A clip and a respective clipping device for filling loosely goods, like cheeses or a single good, like a ham or a turkey, in a bag-shaped packaging, is known from EP patent application 1 848 640. In this known device, the goods are packaged into a bag-shaped packaging made of a web-like material, which is closed by a closure clip.

According to the kind of products, chubby filled sausages or loosely filled nets, and the material of which the closure clips are made, like metal or plastic, said closure clips have to be closed with a respective closing force for securely closing the packaging casing.

In particular, in the case that a high pressure is necessary for closing the closure clip between the first and second closing tools, the clip material may adhere to one or both of the closing tools. Accordingly, when discharging the just closed packaging casing from the clipping machine, and the closure clip is adhered to one of the closing tools, the casing material of said packaging casing may be damaged or the closure clip retained in the closing tool may break off from said packaging casing. In both cases, the production process has to be stopped for removing the closure clip sticking in the closure tool and the filling material dropped off from the damaged packaging casing, causing a higher amount of waste and maintenance costs.

Thus, it is an object of the present invention to provide a clipping tool assembly with which the above mentioned drawbacks can be overcome and with which the closing process of sausage- or bag-shaped products is enhanced.

BRIEF SUMMARY OF THE INVENTION

According to the present invention, there is provided a clipping tool assembly for closing at least one closure means, like a closure clip, in a packaging machine, like a clipping machine, for closing tubular or bag-shaped packaging casings. The clipping tool assembly comprises a first closing tool and a second closing tool, wherein at least the first closing tool is reversibly movable towards the second closing tool, between an opened position and a closed position, for closing the at least one closure means, and a drive means for reversibly moving at least the first closing tool towards the second closing tool in a closing direction.

In the inventive clipping tool assembly, a pusher means is provided in the region of the second closing tool for pushing the closure means just closed out of the second closing tool.

By providing a pusher means for pushing the closure means just closed out of the second closing tool, the closure means possibly be jammed in the second closing tool, is not needed to be pulled out off said second closing tool by the just closed packaging casing. Thus, the packaging casing is securely prevented from being damaged and the closure clip is securely removed from the second closing tool.

In order to prevent the casing material from being damaged by the pusher means, said pusher means acts on the closure clip. In particular, according to the present invention, the pusher means acts on that part of the closure means, which is supported by the second closure tool.

According to a specific embodiment of the inventive clipping tool assembly, the pusher means include a pusher element and a pusher drive means for driving the pusher element in a pushing direction. In this configuration, a pusher element may act on the closure clip in a predetermined manner with regard to the pushing direction, the pushing force or the like.

In a preferred embodiment of the clipping tool assembly, the pusher drive means include a piston/cylinder drive for linearly moving the pusher element. The pusher element may also be a lever including a portion which is at least approximately linearly movable.

In order to support the pusher element on its linear moving path, in the clipping tool assembly according to the present invention, the second closing tool includes a pusher channel in which the pusher element is reversibly movable in the pushing direction.

In a further preferred embodiment of the clipping tool assembly, the pusher means is coupled to the second closing tool. In such a configuration, the pusher drive means and the pusher element are positioned closed to the second clipping tool, enabling a compact construction of the pusher means and the clipping tool assembly.

Advantageously, the pusher channel is a through hole, preferably, a circular through hole, extending through the second closing tool in the closing direction. Accordingly, the pusher element comprises a cylindrical portion which at least approximately matches the cross section of the through hole in the second closing tool. The movement of the pusher element in the closing direction may easily be adjusted to the movement of the closing tools. Naturally, the moving direction of the pusher element may also be different to the closing direction.

For closing a U-shaped closure clip which is provided in a line of clips, the first closure clip in said line of clips is positioned in the second closing tool (so called "R-Clips"). In this case, the second closing tool may comprise a guide groove for securely holding and guiding the closure clip while being closed. For enabling the pusher means to push the closure clip out of the second losing tool, the through hole terminates in said guide groove, thereby preventing the casing material from being damaged by the pusher element.

For closing a U-shaped closure clip, its legs are bent about the plait-like portion of the packaging material. In order to guide the legs of the closure clip while being bent, the second closing tool may comprise two guide grooves, which are arranged parallel to each other in the surface of the second closing tool facing the first closing tool which pushes the closure clip towards the second closing tool (so called "S-Clips"). In this case, it is advantageous that the through hole terminates between said two guide grooves for preventing the closure clip from being tilted when pushed out of the second closing tool.

Alternatively to the pusher means including a mechanical pusher element, in the sense of the present invention, the closure clip may also be pushed out of the second closure tool by pressurized air guided through a hole in the second closing tool or a groove between the closed closure clip and the closing tool.

A clipping machine for producing sausage-shaped products, like sausages, by filing a filling material into a tubular or bag-shaped packaging casing and closing said packaging casing by a closure means, like a closure clip, the clipping machine, which comprises a clipping tool assembly according to the present invention provides the same advantages as described in conjunction with the inventive clipping tool itself.

Furthermore, the clipping tool assembly according to the present invention may be used in a packaging machine for closing tubular or bag-shaped packaging casings by at least one closure means, like a closure clip. That means, the use of the inventive clipping tool assembly is not limited to the production of sausage-shaped products. The inventive clipping tool assembly may be used in each packaging machine in which a packaging material is closed by a closure means, like a closure clip.

In some cases, e.g. when using sensitive packaging material or when packaging sensitive filling material, it is necessary to ensure that the closure means is securely removed from the closing tools before the next closing event has been started. A sensor device which is adapted to detect the presence or the absence of a closure means, or parts of a closure means, may securely prevent starting a closing event in case that a closure means or parts thereof has been left in one of the first or second closing tools.

The sensor device is advantageously coupled to the control unit of the packaging machine for interrupting the production process by detecting a closure means in the closure tools e.g. after a previously produced product has been carried out of the packaging machine, or immediately before starting a closing event.

The sensor device includes a suitable sensor element, like a laser sensor or a photosensor. In the simplest case, a light beam may be used, which is blocked by a closure clip unintentionally or accidentally left in the closing tools.

Further advantages and preferred embodiments will be described in the following together with the drawings listed below. The expressions "left", "right", "below" and "above" used in the following description, are referred to the drawings in an alignment such that the reference numbers and the notation of the Figs. used can be read in normal.

DETAILED DESCRIPTION OF THE INVENTION

Figure 1:
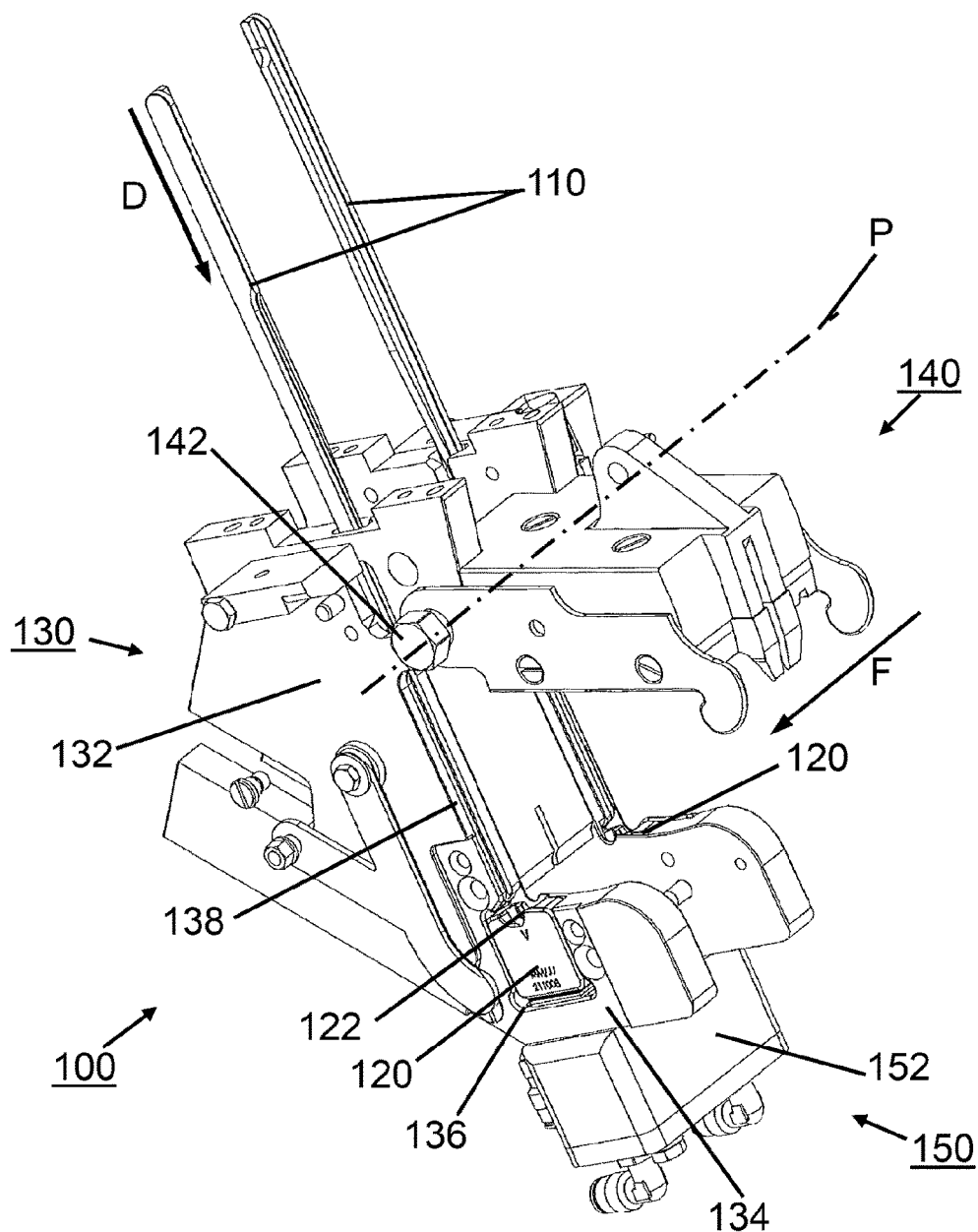
FIG. 1: is a schematic and perspective view to an embodiment of a clipping tool assembly according to the present invention.

FIG. 1 shows an embodiment of a clipping tool assembly according to the present invention. Clipping tool assembly 100 according to FIG. 1 comprises a first closing tool 110, namely a punch, and a second closing tool 120 in the form of a die. As it can be seen in FIG. 1, clipping tool assembly 100 is a so called "double clipping" device, which means that it comprises two pairs of first and second closing tools 110, 120, for simultaneous closing two closure means, like closure clips C, arranged parallel to each other in a filling direction F. Each pair of the first and second closing tools 110, 120 are identically constructed, thus, only one pair of closing tools 110, 120 will be described in detail below.

First and second closing tools, or punch and die 110, 120, are supported in an at least approximately L-shaped framework 130, including a longitudinally extending first part 132 and second part 134 extending nearly rectangular from the lower end of first part 132.

Punch 110 extends longitudinally in a closing direction D and at least approximately parallel to first part 132 of framework 130. Die 120 is accommodated in a recess 136 in the upper surface of second part 134 of framework 130, being aligned in the closing direction D and facing towards punch 110. Second part 134 of framework 130 comprises a recess 136, in which die 120 is accommodated, and which is aligned in closing direction D. Die 120 comprises at least one groove 122 in the surface facing punch 110, through which the legs of the U-shaped closure clip are guided when bent around the gathered portion of the packaging material to be closed.

A gathering means 140 in the form of a lever is pivotally coupled to the upper end of first part 132 of framework 130 by a pivot bolt 142 including a pivot axis P. Pivot axis P is aligned parallel to filling direction F. In an opened position, as shown in FIG. 1, gathering means or gathering lever 140 is pivoted away from first part 132 of framework 130. In a closed position in which gathering lever 140 is pivoted towards first part 132 of framework 130, the plane surfaces of gathering lever 140 and first part 132 of framework 130, facing each other, are aligned parallel to each other. In these surfaces, guide grooves 138, 148 are arranged for guiding punch 110 in the closing direction D.

As it further can be seen in FIG. 1, a pusher means 150 is arranged in the region of dies 120. Pusher means 150 comprises a pusher drive 152, which is arranged below second part 134 of framework 130, in particular, below dies 120. Pusher means 150 further comprises one pusher element 154 (see FIG. 2) per die 120, which is driven by pusher drive 152.

Figure 2:
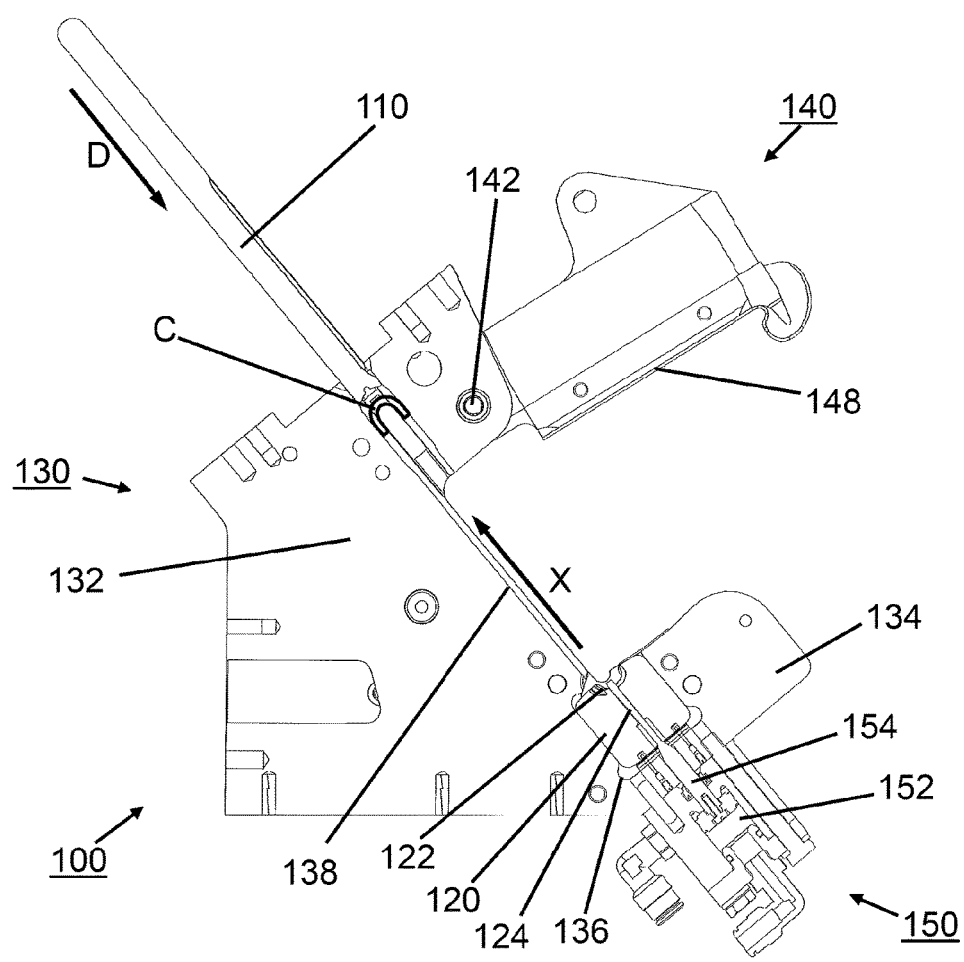
FIG. 2: is a cross section view of the clipping tool assembly according to FIG. 1.

FIG. 2 is a cross section view of the clipping tool assembly 100 according in a plane parallel to closing direction D and vertically to pivot axis P through the front most pair of closing tools 110, 120 of FIG. 1.

As disclosed above, punch 110 and die 120 are aligned in closing direction D. Punch is slidably guided in grooves 138, 140 in first part 132 of framework 130 and gathering lever 140. A U-shaped closure clip C is positioned immediately below punch 110 and is guided in grooves 138, 148 of first part 132 of framework 130 and gathering lever 140.

Die 120 comprises at least one groove 122 in its surface facing in the closing direction towards punch 110. Moreover, a through hole 124 is arranged in die 120, which extends from the surface facing in closing direction D and away from punch 110 towards the surface facing in closing direction D and towards punch 110. Through hole 124 is aligned in closing direction and terminates at least partially in groove 122. In the case hat die 120 comprises two guide grooves 122 for guiding the legs of closure clip C when bent about the plait-like portion of the packaging casing, through hole 124 terminates in a region between said two guide grooves 124.

As it can be seen in FIG. 2, pusher drive 152 is arranged at second part 134 of framework 130 below die 120. Pusher drive 152 is carried out as a piston/cylinder drive powered by a pressurized fluid, like pressurized air. Pusher element 154 has the form of a pin extending in closing direction D and into through hole 124 in die 120. Pusher element 154 is coupled to the piston of pusher drive 152 and reversibly movable driven by said pusher drive 152 between a retracted position and a pushing position in a pushing direction which coincides with closing direction D.

In the pushing position, which is shown in FIG. 2, the free end of pusher element 154 exceeds at least groove 122 in die 120, whereas in the retracted position, the free end of pusher element 154 is positioned inside through hole 124 of die 120.

For closing a tubular or bag-shaped packaging casing by a closure clip C, said filled tubular or bag-shaped packaging is gathered by gathering means, and a plait-like portion is formed on which one or two closure clips have to be applied.

In a clipping machine including a clipping tool assembly according to the embodiment shown in FIGS. 1 and 2, a filled tubular casing is positioned between first part 132 of framework 130 and gathering means 140 when in a position pivoted away from first part 132 of framework 130, as shown in FIG. 1. By pivoting gathering lever 140 downwardly towards framework 130 said filled tubular casing is gathered between first part 132 of framework 130 and gathering lever 140, forming a stripe-like portion to the casing material, which is at least approximately free from filling material. Thereafter, punch 110 together with closure clip C is moved in closing direction D downwardly towards die 120. Thereby the stripe-like portion of the casing material between first part 132 of framework 130 and gathering lever 140 is further gathered by punch 110, forming a plait-like portion enclosed by closure clip C. In the lowest section of the moving path of closure clip C, the free end of closure clip C are guided through guide grooves 122 in die 120 for being bent around the plait-like portion of the casing material and for closing the tubular packaging casing. After the closure clip has been closed, punch 110 is moved upwardly away from die 110. During the closing process described above, pusher element 152 is in its retracted position.

Simultaneously with the movement of die 110 away from die 120 or a predetermined time period after the movement of punch 110 away from die 120 has been started, pusher drive 152 will be activated for moving pusher element 154 from its retracted position into its pushing position shown in FIG. 2. Thereby the free end of pusher element 154, accommodated in through hole 124 during the closing process, projects into groove 122 and pushes closure clip C just closed out of die 120.

In an alternative embodiment of the pusher means, a pusher drive may include a spring element holding the pusher element in its pushing position. During the closing process, the pusher element will be shifted into the retracted position by the closing force applied thereto by punch 110 against the force of the spring element. After the closing process has finished and punch 110 is moved away from die 120, the pusher element is moved by the force of the spring element into its pushing position, thereby pushing out the closure clip C just closed out of die 120.

In a further alternative embodiment, the pusher means may comprise a nozzle forming the pusher element, which is coupled to a pressure source, and via which pressurized air may be discharged to the second closing tool, for urging a closure clip C out of the second closing tool. In particular, the pressurized air may be discharged into a gap between the closure clip C and the die 120, or into groove 122 in die 120.

In order to ensure that a closure clip C, which has just been closed by the first and second closing tool 110, 120, has left both of the first and second closing tools 110, 120, a sensor device may be arranged in the region of at least the second closing tool 120.

The sensor device may include a sensor element, like a laser sensor or a photo-sensor, which is directed to one of the first or second closing tools 110, 120, for detecting the presence or the absence of a closure clip C.

In case that a closure clip, or parts thereof, are detected in die 120, after the tubular or bag-shaped package has been closed and carried out of the packaging machine, like a clipping machine, a respective signal may be sent to the control unit of the packaging machine, for stopping the production process.

Pusher element 154 of pusher means 150 not necessarily has to be positioned in die 120. Pusher element 152 may also be positioned closed to die 120 in a manner to be able to act on closure clip C positioned in die 120 when being closed.

Naturally, a pusher means according to the present invention is not limited to be positioned in the region of the second closing tool. A pusher means may also be positioned in the region of the first closing tool in order to push out a closure clip just closed out of the first closing tool.

Moreover, in a clipping tool assembly according to the present invention both, the first and the second closing tools may be reversibly movable towards each other in order to close a closure clip there between. Accordingly, the pusher means may be coupled to the first and second closing tools, e.g. via the closing levers carrying the first and second closing tools, in a manner to be movable together with the first and second closing tools.

It has to be understood that the pusher means is coupled to a control unit of the packaging machine, and that the pusher means is controlled by said control unit.

What is claimed is:

1. A clipping tool assembly for closing at least one closure clip in a packaging machine for closing tubular or bag-shaped packaging casings, comprising:
   a first closing tool and a second closing tool, wherein at least the first closing tool is reversibly movable towards the second closing tool, between an opened position and a closed position, for closing the at least one closure clip;
   a drive for reversibly moving at least the first closing tool towards the second closing tool in a closing direction; and
   a pusher unit provided in a region of the second closing tool and including a pusher element configured for pushing a closed closure clip out of the second closing tool,
   wherein the pusher unit acts on a part of the closure clip which is supported by the second closing tool,
   wherein the second closing tool includes a pusher channel in which the pusher element is reversibly movable in a pushing direction,
   wherein the pusher channel is a through hole extending through the second closing tool in the closing direction, and
   wherein the second closing tool comprises a guide groove configured for guiding the closure clip while the closure clip is being closed, and wherein the through hole terminates in said guide groove.

2. The clipping tool assembly according to claim 1, wherein the pusher unit includes a pusher drive means configured for driving the pusher element in the pushing direction.

3. The clipping tool assembly according to claim 2, wherein the pusher drive means includes a piston/cylinder drive configured for linearly moving the pusher element.

4. The clipping tool assembly according to claim 1, wherein the pusher unit is coupled to the second closing tool.

5. The clipping tool assembly according to claim 1, wherein the second closing tool comprises two guide grooves configured for guiding the closure clip, and the through hole terminates between said two guide grooves.

6. The clipping tool assembly according to claim 2, wherein the through hole has a circular cross section, and the pusher element comprises a cylindrical portion matching the circular cross section of the through hole in the second closing tool.

7. A clipping machine for producing sausage-shaped products, comprising a clipping tool assembly according to claim 1, wherein the clipping machine is adapted to fill a filling material into a tubular or bag-shaped packaging casing and close said packaging casing by a closure clip.

8. A packaging machine comprising the clipping tool assembly according to claim 1, wherein the packaging machine is adapted for closing tubular or bag-shaped packaging casings by at least one closure clip.

* * * * *